United States Patent
Lim et al.

(10) Patent No.: US 10,596,902 B2
(45) Date of Patent: Mar. 24, 2020

(54) METHOD OF CONTROLLING IMPLEMENTATION OF DRIFT DRIVING STATE OF VEHICLE

(71) Applicants: HYUNDAI MOTOR COMPANY, Seoul (KR); KIA MOTORS CORPORATION, Seoul (KR); HYUNDAI WIA CORPORATION, Changwon-si (KR)

(72) Inventors: Sung Keun Lim, Suwon-si (KR); Ji Woong Yi, Hwaseong-si (KR)

(73) Assignees: HYUNDAI MOTOR COMPANY, Seoul (KR); KIA MOTORS CORPORATION, Seoul (KR); HYUNDAI WIA CORPORATION, Changwon-si (KR)

( * ) Notice: Subject to any disclaimer, the term of this patent is extended or adjusted under 35 U.S.C. 154(b) by 18 days.

(21) Appl. No.: 16/155,476

(22) Filed: Oct. 9, 2018

(65) Prior Publication Data

US 2019/0337385 A1 Nov. 7, 2019

(30) Foreign Application Priority Data

May 4, 2018 (KR) .................. 10-2018-0052049

(51) Int. Cl.
 *B60K 23/08* (2006.01)
(52) U.S. Cl.
 CPC .. *B60K 23/0808* (2013.01); *B60K 2023/0858* (2013.01)

(58) Field of Classification Search
 USPC ............................................ 701/69
 See application file for complete search history.

(56) References Cited

U.S. PATENT DOCUMENTS

| 5,270,930 | A | * | 12/1993 | Ito | ............... | B60K 17/346 |
| | | | | | | 701/69 |
| 6,064,930 | A | * | 5/2000 | Shibahata | ............ | B60T 8/1755 |
| | | | | | | 701/36 |
| 7,264,077 | B2 | * | 9/2007 | Mori | ............... | B60K 17/35 |
| | | | | | | 180/197 |
| 7,395,142 | B2 | * | 7/2008 | Mori | ............... | B60K 28/14 |
| | | | | | | 180/443 |

(Continued)

FOREIGN PATENT DOCUMENTS

KR 10-2007-0047574 A 5/2007

*Primary Examiner* — Dirk Wright
(74) *Attorney, Agent, or Firm* — Morgan, Lewis & Bockius LLP

(57) ABSTRACT

A method of controlling implementation of a drift driving state of a vehicle, may include a slip inducement step, wherein in a state that drift mode is selected, when a vehicle enters into rotary driving and is in a power-on state, a controller reduces front wheel distribution torque of all-wheel drive (AWD) system in comparison to cases other than the drift mode; a slip torque control step, wherein when a rear wheel slip of the vehicle is generated, the controller allows the vehicle to enter into drifting by adding slip control torque according to lateral acceleration of the vehicle to the front wheel distribution torque; and a drift maintenance step, wherein when a counter steering state by a driver is confirmed, the controller maintains a drift driving state of the vehicle by releasing all the front wheel distribution torque.

9 Claims, 3 Drawing Sheets

(56) References Cited

U.S. PATENT DOCUMENTS

| | | | | |
|---|---|---|---|---|
| 7,516,006 B2 * | 4/2009 | Mori | ................ | B60K 23/0808 180/233 |
| 7,607,506 B2 * | 10/2009 | Matsuno | ............ | B60K 23/0808 180/197 |
| 7,680,576 B2 * | 3/2010 | Nagura | .............. | B60K 23/0808 180/197 |
| 7,680,577 B2 * | 3/2010 | Mori | ...................... | B60T 8/172 701/69 |
| 7,909,126 B2 * | 3/2011 | Gaffney | ................ | B60T 8/1755 180/197 |
| 9,266,522 B2 * | 2/2016 | Kodama | ............... | B60W 10/20 |

* cited by examiner

METHOD OF CONTROLLING IMPLEMENTATION OF DRIFT DRIVING STATE OF VEHICLE

CROSS REFERENCE TO RELATED APPLICATION

The present application claims priority to Korean Patent Application No. 10-2018-0052049, filed May 4, 2018, the entire contents of which is incorporated herein for all purposes by this reference.

BACKGROUND OF THE INVENTION

Field of the Invention

The present invention relates generally to a method of controlling implementation of a driving state of a vehicle and, more particularly, to a method of controlling a vehicle with functions of all-wheel drive (AWD) and limited slip differential (LSD), which enables the vehicle to perform drift driving.

Description of Related Art

Drifting means a continuous driving state in which a vehicle is induced in a direction of oversteer by slipping driving wheels using driving force of the vehicle, and a steering angle direction of front wheels is operated in an opposite direction to the rotation of the vehicle.

In case of sport-based vehicles and high-performance vehicles, such as sedans, coupes, and sports cars, the possibility of a drift driving for increasing an interest in driving may be a very important marketing point.

However, in spite of a high-performance vehicle, if the vehicle has an all-wheel drive (AWD) system, drift driving is impossible due to a slip suppression function by the all-wheel drive (AWD) system.

Therefore, when consumers purchase vehicles, the consumer must decide between a two-wheel drive (2WD) vehicle based on front engine rear drive (FR), which provides the pleasure of drifting but is unstable while driving, and an FR-based AWD vehicle, which is unable to be drifted but is excellent in driving stability and traction performance.

Meanwhile, the all-wheel drive (AWD) system implements a torque distribution function between front and rear wheels of a vehicle, but cannot execute the distribution between left and right torque. On the other hand, limited slip differential (LSD) executes the distribution between left and right driving wheels, so that the vehicle easily maneuvers a rough road. Further, when the vehicle rotates, the slip of internal wheels is suppressed, and an understeer phenomenon is suppressed by delivering torque to external wheels, improving the handling performance of the vehicle, and not disturbing the implementation of drift driving of the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling implementation of a driving state of a vehicle which is basically operated by rear wheels using limited slip differential (LSD), and is disposed with an all-wheel drive (AWD) system controlling contribution torque distributed to front wheels according to a driving situation of the vehicle. Accordingly, in an ordinary driving situation, the vehicle is excellent in driving stability and traction performance, and also provides the pleasure of driving by facilitating drift driving according to a driver's preference, ultimately improving the marketability of the vehicle.

In various aspects of the present invention, there is provided a method of controlling implementation of a drift driving state of a vehicle, the method including: a slip inducement step, wherein in a state where drift mode is selected, when a vehicle enters into rotary driving and is in a power-on state, a controller reduces front wheel distribution torque of all-wheel drive (AWD) system in comparison to cases other than the drift mode; a slip torque control step, wherein when a rear wheel slip of the vehicle is generated, the controller allows the, vehicle to enter into a drift driving state by adding slip control torque according to lateral acceleration of the vehicle to the front wheel distribution torque; and a drift maintenance step, wherein when a counter steering state by a driver is confirmed, the controller maintains a drift driving state of the vehicle by releasing all the front wheel distribution torque.

The slip control torque may be determined to have a relatively smaller value as the lateral acceleration of the vehicle increases.

The slip control torque may be determined to have a relatively smaller value as the lateral acceleration of the vehicle increases, and when the lateral acceleration of the vehicle exceeds predetermined reference lateral acceleration, the slip control torque may be released.

The slip control torque may be determined by multiplying base slip control torque determined by a slip of rear wheels and a slip change rate and gain according to the lateral acceleration of the vehicle, and the gain may be set to have a smaller value as the lateral acceleration increases.

The control method may further include a stabilization step, wherein if yaw angular acceleration of the vehicle exceeds predetermined reference angle acceleration, damping torque for lowering the yaw angular acceleration of the vehicle is applied to front wheels.

According to an exemplary embodiment of the present invention, the vehicle is disposed with both limited slip differential (LSD) and all-wheel drive (AWD) systems, so is excellent in driving stability and traction performance. Also, the vehicle can enter into a drift driving state according to the driver's preference, and a stable drift driving state can be maintained after entering into the drift driving state, providing a pleasant driving experience for the driver.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
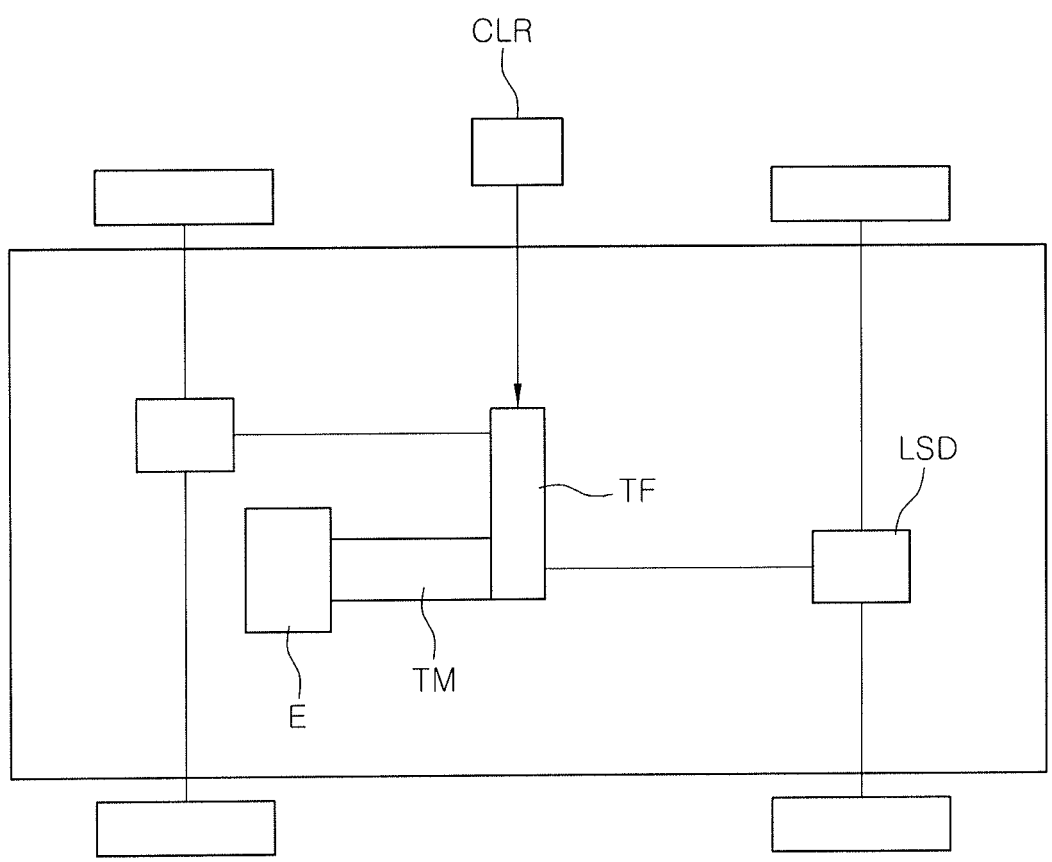
FIG. 1 is a conceptual view of a vehicle disposed with both limited slip differential (LSD) and all-wheel drive (AWD) systems which can be applied to the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

With reference to FIG. 1, rear wheels of a vehicle are connected to limited slip differential (LSD). Accordingly, by the LSD, a differential function between left and right wheels is provided, and driving torque between the left and right wheels is distributed according to a driving situation. Furthermore, an all-wheel drive (AWD) system includes: a transfer case (TF) configured to adjust a portion of power provided from an engine (E) to the rear wheels toward a transmission (TM) and deliver the portion thereof to front wheels; and a controller (CLR) for controlling the transfer case (TF).

When slipping occurs between a road surface and the rear wheels which act as main driving wheels, by receiving information, such as the wheel speed of the front and rear wheels and the output torque of the transmission, the controller (CLR) suppresses the slipping by increasing front wheel distribution torque provided to the front wheels, improving driving stability and traction of the vehicle.

A method of controlling implementation of a drift driving state of a vehicle according to an exemplary embodiment of the present invention is applied to the vehicle as above, so drifting of the vehicle is possible according to a driver's preference.

Figure 2:
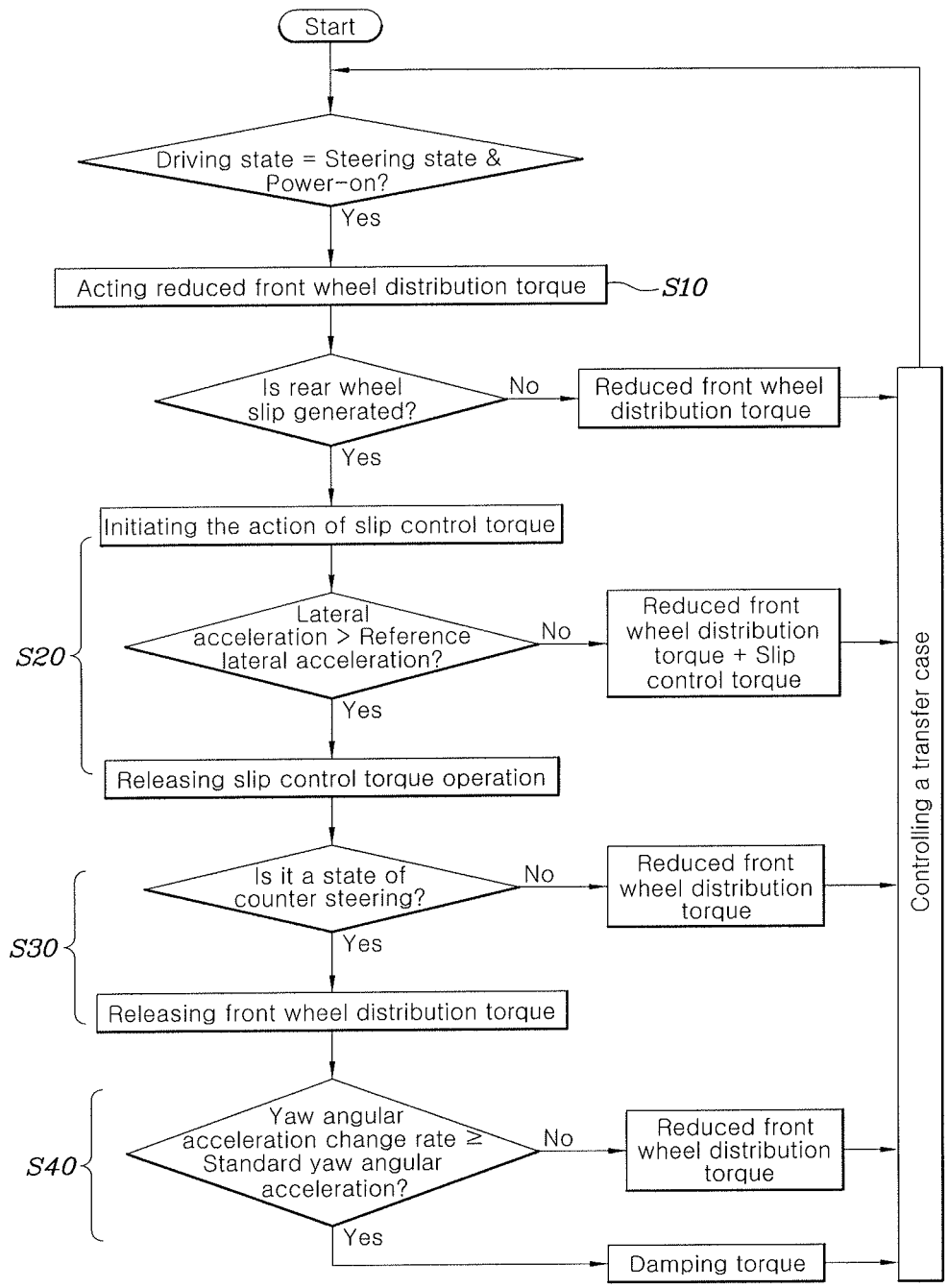
FIG. 2 is a flow chart illustrating an exemplary embodiment of a method of controlling implementation of a drift driving state of a vehicle according to an exemplary embodiment of the present invention.
Figure 3:
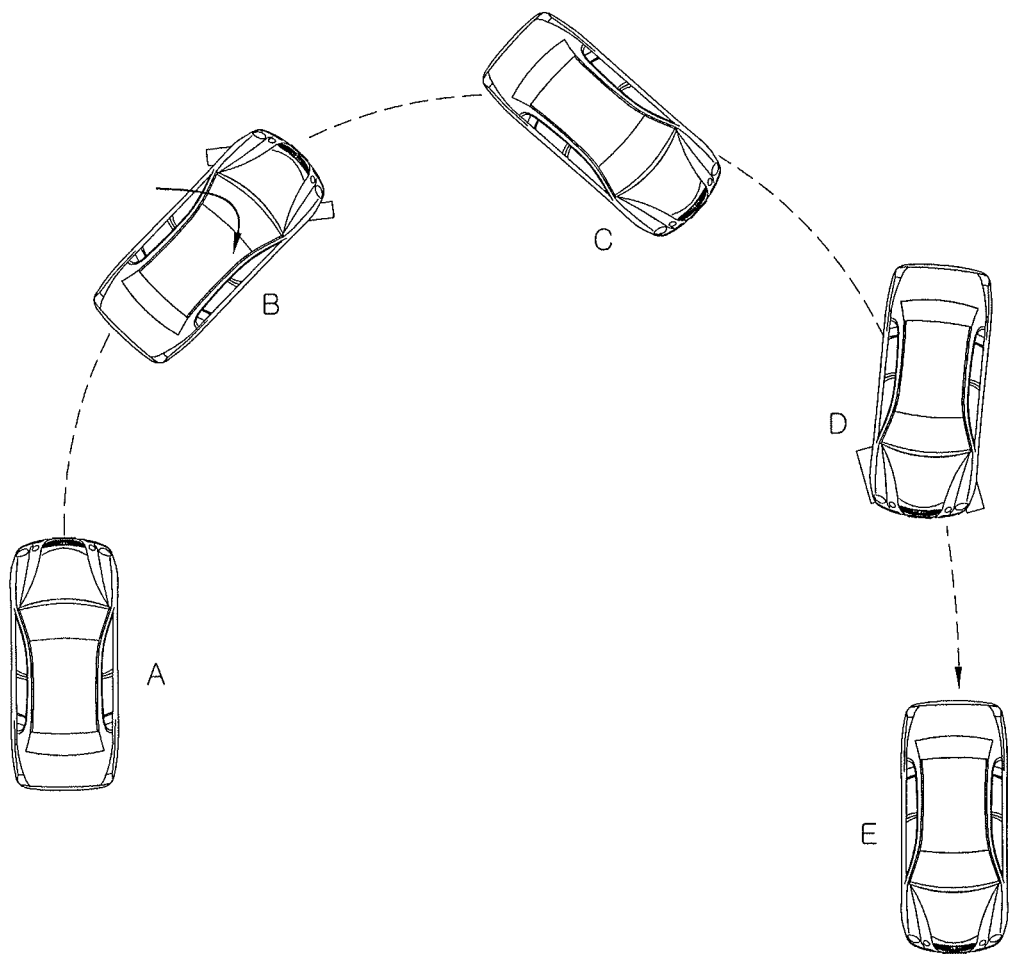
FIG. 3 is a view illustrating the implementation of a drift driving state of a vehicle according to an exemplary embodiment of the present invention.

With reference to FIG. 2 and FIG. 3, the method includes: a slip inducement step (S10), wherein in a state where drift mode is selected, when a vehicle enters into rotary driving and is in a power-on state, a controller reduces front wheel distribution torque of all-wheel drive (AWD) in comparison to cases other than the drift mode; a slip torque control step (S20), wherein when a rear wheel slip of the vehicle is generated, the controller allows the vehicle to enter into a drift driving state by adding slip control torque according to lateral acceleration of the vehicle to the front wheel distribution torque; and a drift maintenance step (S30), wherein when a counter steering state by a driver is confirmed, the controller maintains a drift driving state of the vehicle by releasing all the front wheel distribution torque.

In other words, the controller (CLR) determines that a driver intends to actively perform drift driving if the vehicle enters into rotary driving in a state where the driver selects drift mode, so front wheel distribution torque distributed to the front wheels by the all-wheel drive (AWD) system is reduced. Accordingly, by inducing the slip of the rear wheels unlike an ordinary vehicle with the AWD system, the vehicle enters into a drifting state.

In this regard, the controller (CLR) may recognize whether the driver selects the drift mode by any separate switch included in the vehicle, and may determine whether the vehicle is rotating, and is in a power-on state by a signal of a steering angle sensor and a signal of an acceleration pedal sensor.

Furthermore, in the slip inducement step (S10), reducing the front wheel distribution torque in comparison to cases other than the drift mode means being reduced in comparison to the front wheel distribution torque determined to be provided for the front wheels to prevent the sip of vehicle wheels by the all-wheel drive (AWD) system if all other driving conditions, such as a road condition, a turning radius, and a vehicle speed, etc., are the same, and the situation is an ordinary rotary driving situation in which the drift mode is not selected. Consequently, it means that the front wheel distribution torque is reduced to a level of allowing slipping of the rear wheels.

In a state of reducing the front wheel distribution torque as above, if the driver increases a pressing amount of an acceleration pedal, the slipping of the rear wheels is easily induced.

When the slipping of the rear wheels is generated as above, the controller (CLR) performs the slip torque control step (S20), so enables entry into a practical drift state.

In other words, the slip control torque is determined to have a relatively smaller value as the lateral acceleration of the vehicle increases, and is added to the reduced front distribution torque to be supplied to the front wheels. In an exemplary embodiment of the present invention, the slip control torque is determined to be decreased, as the lateral acceleration of the vehicle increases.

In this regard, on a high frictional road whose vehicle lateral acceleration is relatively high, the slip control torque is rarely provided for the slip control torque, consequently allowing drift driving. On the other hand, on a snowy road or an icy road whose lateral acceleration is low, even if the drift mode is selected, the slip control torque is additionally applied to the front wheels to secure the driving stability of the vehicle, practically suppressing the entry into a drift state.

Eventually, the slip torque control step as above only enables a drift driving under a road condition where the vehicle can practically enter into a drift driving state in a stable condition. When it is determined that the stability of the vehicle is more important considering the road condition, even if the drift mode is selected by the mal-operation of the driver, the entry into the drift driving state is suppressed, securing the driving stability of the vehicle.

Therefore, the slip control torque is determined to have a relatively smaller value as the lateral acceleration of the vehicle increases, and may be released if the lateral acceleration of the vehicle exceeds predetermined reference lateral acceleration. Accordingly, in case of rotary driving on an ordinary high frictional road, since the lateral acceleration of a vehicle is 0.6 G or more, the reference lateral acceleration may be set to 0.6 G, for example.

For reference, in FIG. 2, when the rear wheel slipping is initiated by the slip inducement step (S10), the slip torque control step (S20) is proceeded. Accordingly, when the lateral acceleration of the vehicle is less than reference lateral acceleration, the slip control torque caused by the lateral acceleration is added to the front wheel distribution torque determined to be reduced by the slip inducement step (S10) to control the transfer case (TF). On the other hand, when the lateral acceleration exceeds the reference lateral acceleration, the vehicle enters into the drift mode by releasing the slip control torque.

Furthermore, the slip control torque determines base slip control torque according to the slipping of the rear wheels and a slip change rate, and can be determined by multiplying gain according to the lateral acceleration of the vehicle.

In an exemplary embodiment of the present invention, the slip control torque is determined by multiplying base slip control torque determined by a slip of rear wheels and a slip change rate and gain according to the lateral acceleration of the vehicle.

In this regard, the gain may be set to have a smaller value as the lateral acceleration increases. In an exemplary embodiment of the present invention, the gain may be set to be decreased as the lateral acceleration increases.

As above, the vehicle initiates drift by the slip torque control step (S20), and a counter steer state, in which the driver operates a steering wheel in an opposite direction to rotation, is checked, the controller (CLR) determines that a drift driving state begins have begun, so releases all the front wheel distribution torque provided for the front wheels to continuously maintain the drift state.

In the drift driving state maintained as above, if the mistake of the driver, such as the excessive operation of an accelerating pedal, occurs, spinput of the vehicle may occur without maintaining the drift state.

According to an exemplary embodiment of the present invention, to prepare the present case, if the yaw angular acceleration of the vehicle exceeds predetermined reference angular acceleration, a stabilization step (S40) in which damping torque for lowering the yaw angular acceleration of the vehicle is applied to the front wheels may be further executed.

In other words, during the maintenance of the drift state, the generation of spin of the vehicle due to the driver's mistake is detected by a change in yaw angular acceleration, and then torque is distributed as much as the change. Accordingly, the spinput of the vehicle is ultimately prevented, maintaining a stable drift state.

Therefore, the driver can maintain the drift driving state of the vehicle more easily and safely.

With reference to FIG. 3, the drawing illustrates how the drift driving of the vehicle according to an exemplary embodiment of the present invention is executed. State A represents a situation where a vehicle starts rotary driving, and state B represents a situation where oversteer is generated due to the generation of rear wheel slipping caused by acceleration during rotary driving. Thus, the present state is a state where rear wheel slipping is generated by the slip inducement step (S10), so that the slip torque control step (S20) is initiated, and the vehicle enters into a drift driving state.

State C is a state where the driver starts the operation of a steering wheel in a state of counter steering, and in state C, the front wheels are completely operated in the state of counter steering. Thus, the states are situations where a practical drift driving state is implemented.

In states C and D, by the drift maintenance step (S30), the front wheel distribution torque is totally released, and the rear wheels continuously slip, so that the drift driving state is maintained. Also, by performing the stabilization step (S40), vehicle spinput is prevented due to the driver's mistake, so a stable drift driving state is maintained.

State E represents a situation where drift control of the present invention is released because the driver steers in a normal direction according to the rotary direction of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling implementation of a drift driving state of a vehicle, the method comprising:
reducing, by a controller, front wheel distribution torque of all-wheel drive (AWD) when in a state where a drift mode is selected, the vehicle enters into rotary driving and is in a power-on state;
allowing, by the controller, the vehicle to enter into the drift driving state by adding slip control torque according to lateral acceleration of the vehicle to the front wheel distribution torque when rear wheel slipping of the vehicle is generated; and
maintaining, by the controller, the drift driving state of the vehicle by releasing all the front wheel distribution torque, when a counter steering state by a driver is confirmed.

2. The method of claim 1, wherein the slip control torque is determined to be decreased as the lateral acceleration of the vehicle increases.

3. The method of claim 1,
wherein the slip control torque is determined to be decreased as the lateral acceleration of the vehicle increases, and
wherein when the lateral acceleration of the vehicle exceeds a predetermined reference lateral acceleration, the slip control torque is released.

4. The method of claim 1, wherein when the lateral acceleration of the vehicle is less than a predetermined reference lateral acceleration, the slip control torque is added to the front wheel distribution torque.

5. The method of claim 1, wherein the slip control torque is determined by multiplying a base slip control torque and a gain.

6. The method of claim 5, wherein the base slip control torque is determined by a slip of rear wheels of the vehicle and a slip change rate.

7. The method of claim 5, wherein the gain is determined according to the lateral acceleration of the vehicle.

8. The method of claim 5, wherein the gain is set to be reduced as the lateral acceleration increases.

9. The method of claim 1, further including:
applying a damping torque to front wheels of the vehicle for lowering a yaw angular acceleration of the vehicle when the yaw angular acceleration of the vehicle exceeds a predetermined reference angle acceleration.

* * * * *